May 28, 1929.    C. W. DAKE    1,714,590
CONNECTER
Filed Feb. 8, 1926
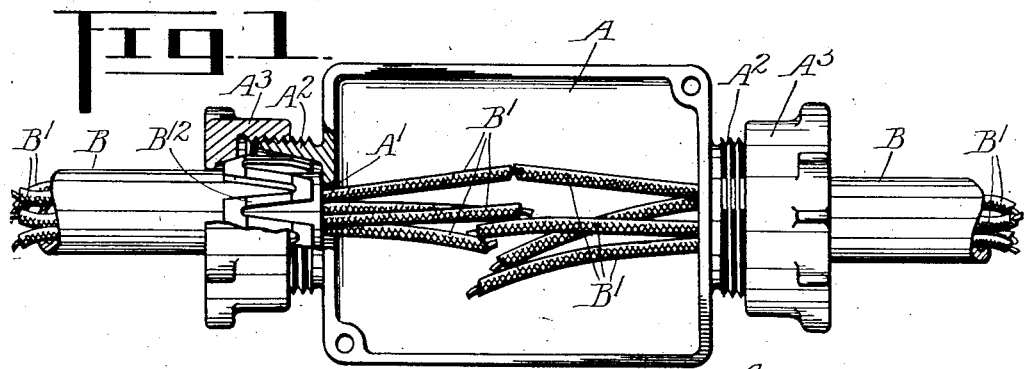
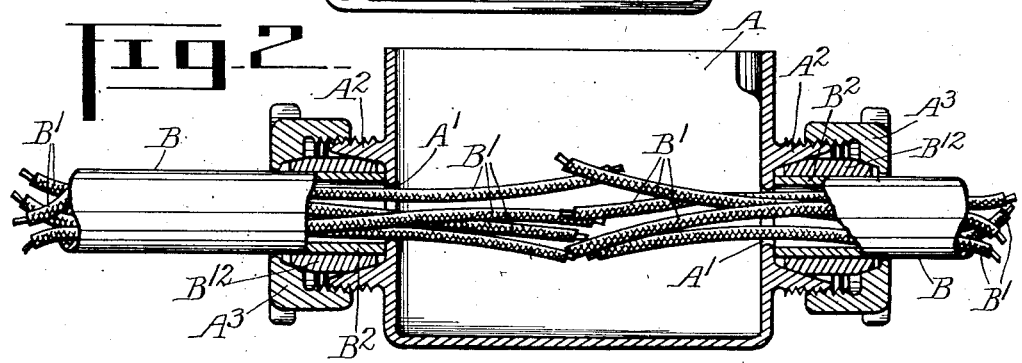
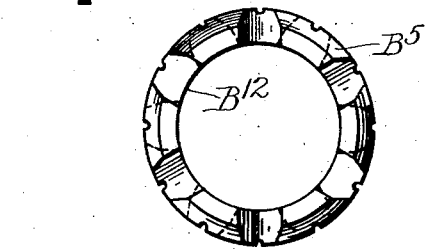
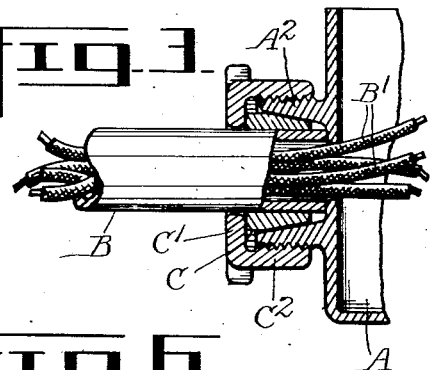
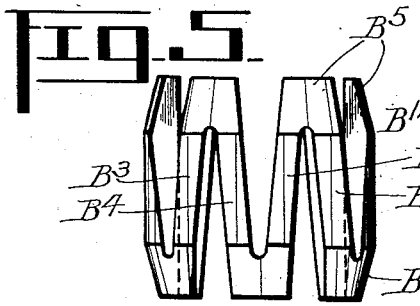
INVENTOR
Charles W. Dake
BY
ATTORNEYS Patented May 28, 1929.

1,714,590

UNITED STATES PATENT OFFICE.

CHARLES W. DAKE, OF CHICAGO, ILLINOIS, ASSIGNOR TO THE PYLE-NATIONAL COMPANY, OF CHICAGO, ILLINOIS, A CORPORATION OF NEW JERSEY.

CONNECTER.

Application filed February 8, 1926. Serial No. 86,722.

My invention relates to improvements in connecters or terminal boxes for use in connection with electric cables or conduits containing a plurality of wires and has for one object to provide in connection with the terminal box means for anchoring or connecting the cable to the box in such manner that the end of the cable may be rigidly held in proper asssociation with the box so that the operator may strip the cable from the conductor wires contained therein without danger of the cable pulling out from the box.

In order that this may be done some means must be provided which within a comparatively short length along the cable will engage it firmly and hold it in position in register with an opening or hole leading into the box and such clamping, holding or gripping means must hold the cable whether it be coated with lead, jute, tape or any other suitable material.

My invention is illustrated more or less diagrammatically in the accompanying drawings, wherein Fig. 1 is a plan view of the connection box showing one of the packing nuts and cups in section.

Fig. 2 is a section along the plane at right angles to Fig. 1 showing the cable zigzag compression sleeve and cup and packing nut in section.

Fig. 3 is a detailed section showing a modified form of zigzag compression washer.

Fig. 4 is an end view of the compression washer.

Fig. 5 is an enlarged plan view of the washer.

Fig. 6 is an enlarged plan view of the washer shown in Fig. 3.

Like characters indicate like parts.

A is the outlet or connection box. It is apertured at $A^1$. Surrounding these apertures are exteriorly threaded packing cups $A^2$ upon which are screwed packing nuts $A^3$. The inner walls of both the nuts and cups are tapered as indicated in opposition to the direction in which they move for tightening.

B is a cable containing a number of wires $B^1$ and provided with a sheath $B^2$ of lead or other suitable material. This cable is of such exterior diameter as to be able to freely pass through the hole on the outside extremity of the packing nut and to penetrate easily within the packing cup $A^2$. Interposed between the exterior walls of the cable and interior walls of the cup and nut is the zigzag compression sleeve $B^{12}$. This zigzag compression sleeve may be formed in any suitable manner so long as it is made up of a series of inclined arms $B^3 B^4$, each arm $B^3$ being joined at each end to one of the arms $B^4$ at either side of it so as to provide a structure the periphery of which may be contracted. The ends of these arms are chamfered at $B^5$ so that the compression sleeve is tapered at both ends, the taper conforming more or less to the taper of the interior walls of the cup and nut.

When the device is assembled, as shown in Figs. 1 and 2, with the zigzag sleeve surrounding the end of the cable sheath and fitting it closely enough for convient assembly and when the cable with the zigzag washer is inserted in the cup and the packing nut is screwed down, the zigzag sleeve will be forced into close contact with the cable because the nut and cup engaging the opposed ends of the sleeve and leading up inclined or chamfered surfaces thereof will tend to contract the sleeve on the cable and grip it. The elasticity of the metal is sufficient to permit this gripping action. Since the compression sleeve is such size that it never closes completely there will always be what is in effect a corrugated surface of contact between the cable and zigzag sleeve and thus a certain amount of interlocking of the material of cable envelope and sleeve thereby effectually preventing the cable from pulling out.

In the modified form shown in Fig. 3 the zigzag sleeve instead of having a comparatively short taper at each end is tapered at one end only. This will also be seen in Fig. 6. The base of the sleeve is cylindrical as at C and is engaged in this case by a flat flange $C^1$ on a similar packing nut $C^2$. In this case the sleeve is compressed or prolapsed merely by engagement with the tapered walls of the compression cup $A^2$. The sole function of the nut in this case is to drive the sleeve into the cup.

It will be evident that while I have shown in my drawings an operative device still many changes might be made both in size, shape, and arrangement of parts without departing materially from the spirit of my invention and I wish, therefore, that my drawings may be regarded as in a sense diagrammatic.

I claim:

1. A clamp for cables and the like comprising a sleeve having tapered ends and a plurality of staggered longitudinally disposed tapering slots, each slot longer than one half the length of the sleeve.

2. A clamp for cables and the like comprising a socket tapered at its end, a cap tapered in opposition to the tapered end of the socket, and means for forcing the cap longitudinally on the socket, a packing ring contained within the socket adapted to be compressed longitudinally between the cap and the bottom of the socket to reduce its circumference, the ring being tapered at either end to conform to the taper of the cap and socket, there being a plurality of V-shaped slots extending inwardly from opposed ends of the ring, the slots being staggered to form a ring of zig-zag cross section.

Signed at Chicago, county of Cook, and State of Illinois, this 26th day of January, 1926.

CHARLES W. DAKE.